May 10, 1927.
T. A. BRYSON
1,628,303
SAFETY GUARD FOR CENTRIFUGAL MACHINES
Filed July 5, 1923
2 Sheets-Sheet 1
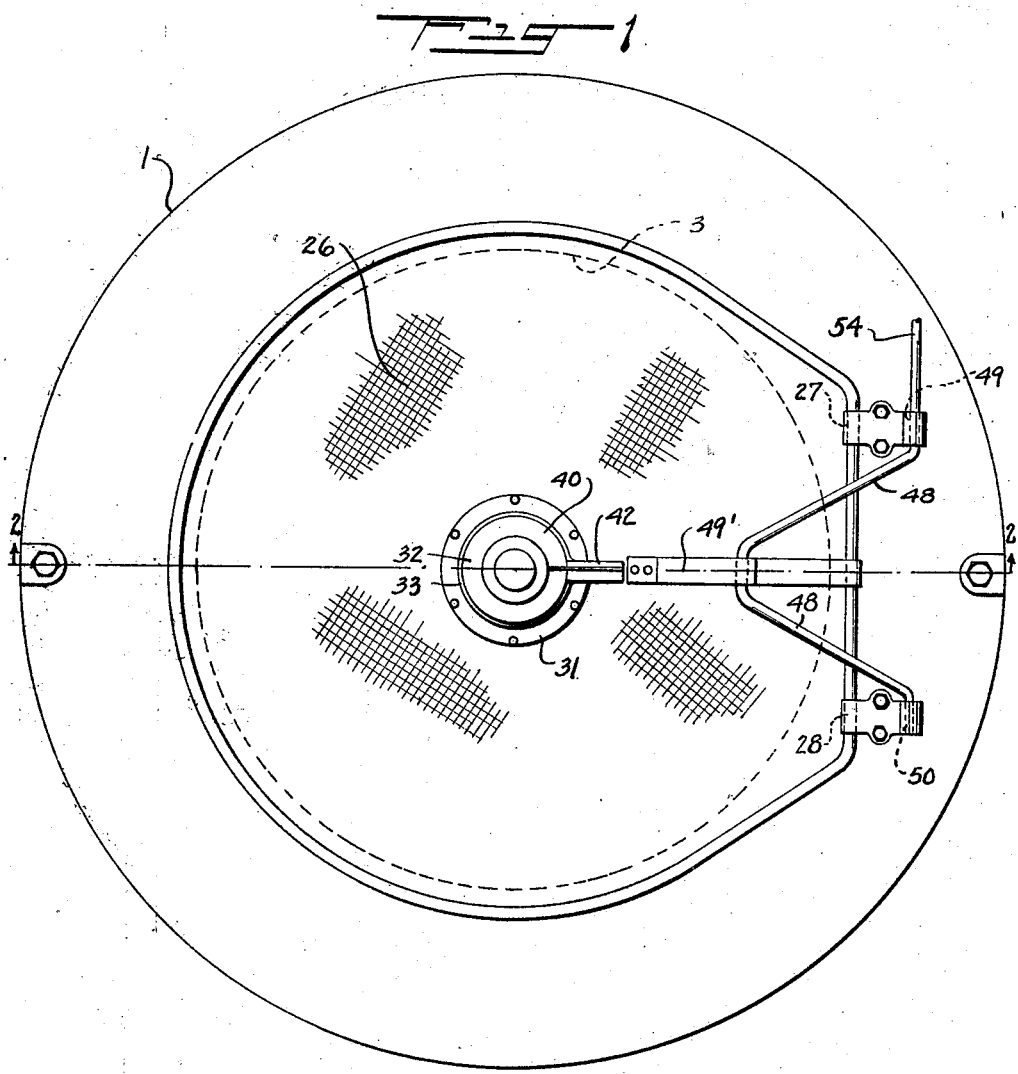

May 10, 1927.
T. A. BRYSON
1,628,303
SAFETY GUARD FOR CENTRIFUGAL MACHINES
Filed July 5, 1923   2 Sheets-Sheet 2
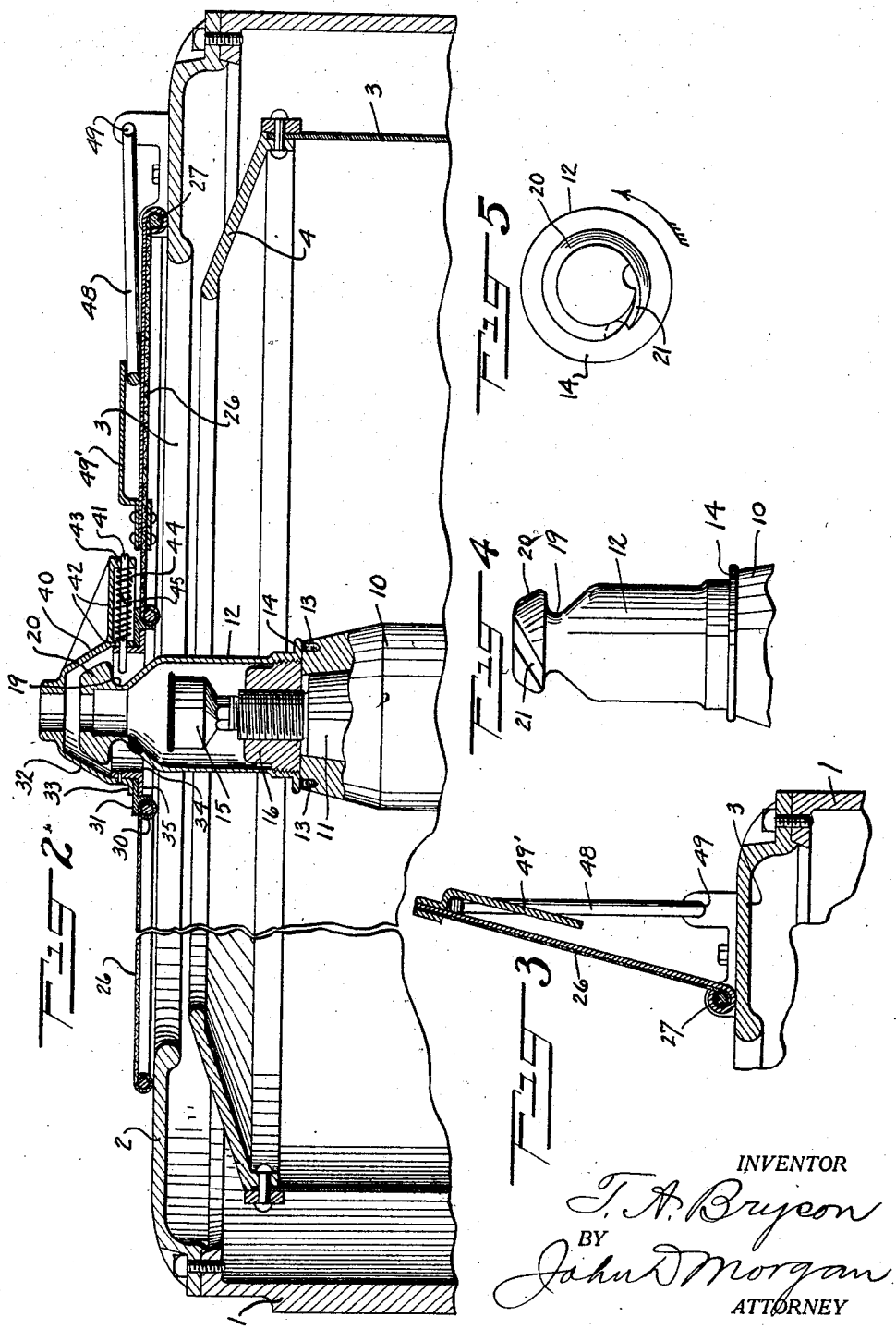
INVENTOR
T. A. Bryson
BY John D. Morgan
ATTORNEY Patented May 10, 1927.

1,628,303

UNITED STATES PATENT OFFICE.

TANDY A. BRYSON, OF TROY, NEW YORK, ASSIGNOR TO TOLHURST MACHINE COMPANY, A CORPORATION OF NEW YORK.

SAFETY GUARD FOR CENTRIFUGAL MACHINES.

Application filed July 5, 1923. Serial No. 649,458.

The invention relates to centrifugal drying machines, commonly known as hydro-extractors, and relates more particularly to safety devices for such machines.

Objects and advantages of the invention will be set forth in part hereinafter and in part will be obvious herefrom or may be learned by practicing the invention.

The invention consists in the novel parts, constructions, arrangements, combinations and improvements herein shown and described.

The accompanying drawings, herein referred to and constituting a part hereof, illustrate one embodiment of the invention, and together with the description serve to explain the principles thereof.

Of the drawings:—

Fig. 1 is a top plan of a machine embodying the invention;

Fig. 2 is a fragmentary, vertical central section, on a greatly enlarged scale, taken substantially on the line 2—2 of Fig. 1;

Fig. 3 is a detached fragmentary detail of the upper right-hand part of Fig. 2, and shows the casing in the open position;

Fig. 4 is a detached side elevation of a part of the automatically-operating closure-locking mechanism shown in the upper central part of Fig. 2; and Fig. 5 is a top plan of Fig. 4.

The invention is directed to providing a novel and useful safety guard, which will necessarily compel the complete closing of the basket closure or lid before the power can be applied to start the basket rotating, and also will effectively prevent the opening of the basket lid or closure before the basket has come absolutely to rest.

In realizing this general object, the invention provides locking means for the basket lid or closure which are movable by the attendant to permit the opening of the lid or closure after the basket has come to rest, but which resists all effort on the part of anyone to open the closure while the basket is rotating even at slowest speed; the present invention being more particularly directed to the under-driven type of machine. In cooperation and conjunction therewith, mechanism is provided whereby the power may be turned on to rotate the basket only when the lid or closure therefor is in the closed and locked position, this means being controlled directly from the basket closure, the closure locking just before the mechanism moves to permit the power to be applied to move the basket.

Referring now to the present preferred embodiment of the invention, illustrated by way of example in the accompanying drawings, a centrifugal machine of a substantially standard under-driven type or form is shown, having a casing 1, provided with an inwardly-extending top flange 2, having the usual central opening through which the material to be dried or otherwise operated upon is introduced into the basket.

Within the casing 1 is a basket 3, provided also with an inwardly-extending top flange 4. The casing and basket may be of any known or convenient form, and are both shown fragmentarily for the reason that the particular construction thereof is not material to the present invention, which is also true of the driving mechanism for the basket. The basket is provided with a centrally-located, upwardly-extending hub 10 projecting upwardly from the bottom of the basket and is carried on a shaft 11, which is part of the basket driving or rotating mechanism.

The member or part of the safety device which rotates with the basket is carried on the upper part of this hub 10, and is shown in vertical central section in Fig. 2, also in side elevation in Fig. 4, and in top plan in Fig. 5. It consists of a hollow column 12, mounted detachably on the top of the hub 10 by suitable means such as screws 13 passing through a horizontally-extending flange 14 formed at the bottom of the column 12, the screws being threaded into the top face of the hub 10. Within this hollow column 12 may be located an oil cup 15, for the basket bearing, screw-threaded into a supporting block 16, which is in turn screw-threaded to the inside of the column 12.

The column 12 at the top thereof is preferably narrowed into a neck 19, and terminates in a conoidal, upwardly-diminishing head 20. The slanting side wall of the head 20 is provided with a helical locking or cam groove 21, as best shown in Figs. 4 and 5. Groove 21 is upwardly inclined in the direction of rotation of the basket.

The casing lid or closure 26 in this type of machine preferably consists of one lid covering the entire opening in the top of the casing and which is hinged at 27 and 28 upon the top flange 2 of the casing. The locking or safety device which co-acts with the head 20 is carried by this lid. As embodied, a central annular support 30 defines a central opening in the lid and provides a support for the locking device. Fixed to the ring 30 on the top side thereof is a flat annular plate 31 which provides a support upon which the locking device is rotatably supported.

The safety device comprises a hollow conoidal member 32, having a horizontally outwardly disposed annular flange 33, which flange rests upon the top surface of the ring 32. Within the lower part of the hollow, conoidal part 20 is a member having a vertically-disposed, cylindrical flange 34, terminating at the bottom in a horizontally-disposed, annular flange 35, beneath, spaced away from, and parallel to the flange 33, whereby the safety member is rotatably supported upon the member 31, which is fixed to the closure 26.

Fixed to the safety member 32 is a bracket 40, which supports a spring-operated latch 41. As embodied, the latch 41 is horizontally disposed, and is mounted to move longitudinally in openings in flanges 42 and 43 of a housing 44, fixed to or carried by the bracket 40. A helical spring 45 is coiled about the latch 41, within the housing, and impels it into locking position, the inner end of the latch 41 projecting also through an opening in the ring 34 already described.

Means are provided for maintaining the closure 26 in the open position, and as embodied a bail 48 is pivoted in lugs 49 and 50 upon the flange 2 of the casing, the central part of the bail being slidable beneath the hook-like member 49′ fastened on the closure. When the closure 26 is raised, the bail 48 allows it to swing backwardly over the center, as shown in Fig. 2, and then supports it in this position until it is closed by the attendant.

Any suitable form of controlling connections are provided between the closure and the drive for the basket, whereby the power may be applied to the basket only when the closure is in the closed position. This mechanism may, if desired, be the same or substantially similar to that shown in my copending application 631,063 filed April 10, 1923. The rod 54 (which may be taken to indicate the power controlling mechanism generally) herein corresponds to the rod 123 in my said copending application and the remainder of the mechanism for controlling the starting or stopping of the basket may be, if desired, the same or similar to that of said copending application.

The manner of operation of the safety device is substantially as follows:

Assuming the closure 26 to be in the open position of Fig. 3, the attendant pulls it over the center of gravity, and closes it, or it will fall of its own weight, to the position shown in Fig. 2. As it does so, the latch 41 strikes the conical surface of the head 20 of the safety device 12, and the latch moves backwardly against the spring, but is then projected forwardly into the neck 19 and is thereby locked in position beneath the head 20, thereby preventing the raising of the closure 26. The operator may now throw on the power (which had been locked in the "off" position until the lid 26 was closed) and start the basket rotating, and the latch 41 will prevent the opening of the closure 26.

The only way to open the closure is to grasp the safety member 32, and rotate it and at the same time lift the closure so that the latch 41 will pass upwardly through the helical groove 21 on the fixed member 12 of the safety device. The direction of inclination of the groove 21 relatively to the direction of rotation of the basket is such that this rotation of the safety device 32 must be in the direction of the rotation of the basket. The sides of the inclined cam groove 21 engage the pin 41 and positively force it downwardly, as long as the basket rotates. It is, therefore, impossible to raise the lid 26 until the basket has come to rest, that is, until after the power has been thrown off. When the basket is stopped, the lid may be opened, but in opening, it locks the power starting mechanism (as described and shown in my application Ser. No. 631,063, already referred to) in the "off" position, and it may not be moved from that position until the lid 26 is again closed.

The invention in its broader aspects is not limited to the specific mechanism shown and described but departures may be made therefrom within the scope of the accompanying claims without departing from the principles of the invention and without sacrificing its chief advantages.

What I claim is:

1. A safety device for centrifugal machines, including in combination a basket, a hub for the basket, a closure for the basket, means, carried partly by the hub and partly by the closure, and located substantially at the center of the closure, for locking the closure to the hub independently of the rotation of the basket.

2. A safety device for centrifugal machines, including in combination a basket, a hub therefor, a closure for the basket, a locking member carried by the closure at substantially the central part thereof, a co-operating locking member carried by the hub and rotating therewith, one of said locking members being rotatable relatively to the part on which it is mounted, said two locking members normally locking the cover closed, and permitting unlocking of the cover only when the said relatively rotatable locking member is slightly rotated.

3. A safety device for centrifugal machines including in combination a basket, having an upwardly projecting central hub, a closure for the basket, and means including a cam and a cooperating pin, one carried by the basket hub and the other by the closure to lock the closure at closed position and prevent the unlocking thereof until the basket is at rest.

4. A safety device for centrifugal machines including in combination a basket having an upwardly projecting central hub, a closure for the basket, and means carried partly by the basket hub and partly by the closure and operated automatically upon closing the closure and independently of the rotation of the basket to lock the closure in closed position, said means also preventing the unlocking until the basket is at rest.

5. A safety device for centrifugal machines including in combination a basket, a closure therefor, a basket hub, and means carried partly by the basket hub and partly by the closure and including a yielding latch at substantially the center of the closure to lock the closure at closed position independently of the rotation of the basket and prevent the unlocking thereof until the basket is at rest.

6. A safety device for centrifugal machines including in combination a basket, a closure therefor, a basket hub, and means carried partly by the basket hub and partly by the closure and including a yielding latch at substantially the center of the closure and operated automatically, independently of the rotation of the basket, upon closing the closure to lock the closure in closed position and prevent the unlocking thereof until the basket is at rest.

7. A safety device for centrifugal machines including in combination a basket, having an upwardly projecting central hub, a closure for the basket, and means carried partly by the basket hub and partly by the closure and including a yielding latch and operated automatically upon closing the closure to lock the closure in closed position, said means also preventing the unlocking until the basket is at rest.

8. A safety device for centrifugal machines including in combination a basket having an upwardly projecting central hub, a closure for the basket, and means carried partly by the basket hub and partly by the closure and including a spring operated latch and operated automatically upon closing the closure to lock the closure in closed position and prevent the unlocking thereof until the basket is at rest.

9. A safety device for centrifugal machines including in combination a basket, a closure therefor, and means carried partly by the basket and partly by the closure and including a spring operated latch and cooperating cam means both at substantially the center of the basket and closure to lock the closure in closed position and prevent the unlocking thereof until the basket is at rest.

10. A safety device for centrifugal machines including in combination a basket, a closure therefor, and means carried partly by the basket and partly by the closure and including a spring operated latch and cooperating rotatable cam means both at substantially the center of the basket and closure and operated automatically upon the closing of the closure to lock the closure in closed position and prevent the unlocking thereof until the basket is at rest.

11. A safety device for centrifugal machines including in combination a basket. having an upwardly projecting central hub, a closure for the basket, means carried partly by the basket hub and partly by the closure and including a spring operated latch to lock the closure at closed position and prevent the unlocking thereof until the basket is at rest, and means operable by an attendant for unlocking said closure when said basket is at rest.

12. A safety device for centrifugal machines including in combination a basket having an upwardly projecting central hub, a closure for the basket, and means carried partly by the basket hub and partly by the closure and including a spring operated latch and operated automatically upon closing the closure to lock the closure in closed position and prevent the unlocking thereof until the basket is at rest.

13. A safety device for centrifugal machines including in combination a basket, a closure therefor, and means carried partly by the basket and partly by the closure, and including a latch and a cooperating locking member having a groove therein inclined in a particular direction to the direction of rotation of the basket to lock the closure at closed position and prevent the unlocking thereof until the basket is at rest.

14. A safety device for centrifugal machines including in combination a basket, a closure therefor, and means carried partly by the basket and partly by the closure and including a latch and a cooperating locking member having a groove therein inclined in the particular direction of rotation of the basket and operated automatically upon closing of the closure to lock the closure in closed position and prevent the unlocking thereof until the basket is at rest.

15. A safety device for centrifugal machines including in combination a basket, having an upwardly projecting central hub, a closure for the basket, and means carried partly by the basket hub and partly by the closure to lock the closure to the hub before the basket starts rotating and prevent the unlocking thereof until the basket is at rest.

16. A safety device for centrifugal machines including in combination a basket having an upwardly projecting central hub, a closure for the basket, and means carried partly by the basket hub and partly by the closure and including a finger and a cooperating locking member having a groove therein inclined in a particular direction to the direction of rotation of the basket to lock the closure at closed position and prevent the unlocking thereof until the basket is at rest.

17. A safety device for centrifugal machines including in combination a basket, a closure therefor, and means for locking the closure in closed position including a finger and a member engaging therewith and having a groove therein for the finger inclined in a definite relation to the rotation of the basket.

18. A safety device for centrifugal machines, including a basket, a hub element rotatable with the basket, a closure element for the basket, cam means carried by one of said elements and a member carried by the other of said elements, adapted to lock the closure closed independently of the rotation of the basket and to allow it to be opened only when the basket has stopped rotating.

19. A safety device for centrifugal machines, including a basket, a hub element rotatable with the basket, a closure element for the basket, cam means carried by one of said elements and a member carried by the other of said elements, the cam means being provided with an inclined cam groove in which the member is adapted to engage, said cam means and member being adapted to lock the closure closed independently of the rotation of the basket, and to allow it to be opened only when the basket has stopped rotating.

20. A safety device for centrifugal machines, including in combination a basket, a closure therefor, means carried partly by the basket and partly by the closure for locking the closure in closed position independently of the rotation of the basket and for preventing opening of the closure until the basket has stopped rotating.

21. A safety device for centrifugal machines, including in combination a basket, a closure therefor, means carried partly by the basket and partly by the closure and located at substantially the axis of the basket for locking the closure in closed position independently of the rotation of the basket and for preventing opening of the closure until the basket has stopped rotating.

22. A safety device for centrifugal machines, including in combination a basket, a closure for the basket, latching means including a pin member and a cooperating member having an inclined groove, one of said members being carried by the closure and the other by the basket, the grooved member normally locking the pin member, but allowing the pin member to ride through the groove in the grooved member to unlock the closure when the member carried by the closure is rotated slightly in the direction of rotation of the basket.

23. A safety device for centrifugal machines, including in combination a basket, a closure for the basket, a pin member, a cooperating member having an inclined groove one of said members being fixed to rotate with the basket, while the other of said members is carried by the closure and rotatable with respect to the closure, the grooved member normally locking the pin member, but allowing the pin member to ride through the groove in it for unlocking, when the member carried by the closure is located slightly in the direction of rotation of the basket.

In testimony whereof, I have signed my name to this specification.

TANDY A. BRYSON.